(12) United States Patent
Konishi

(10) Patent No.: US 8,138,729 B2
(45) Date of Patent: Mar. 20, 2012

(54) GENERATION CONTROL APPARATUS FOR VEHICLES THAT CONTROLS CURRENT SUPPLY TO A FIELD WINDING OF A GENERATOR TO CONTROL OUTPUT VOLTAGE OF THE GENERATOR

(75) Inventor: Toshiya Konishi, Chita-gun (JP)

(73) Assignee: Denso Corporation, Kariya (JP)

( * ) Notice: Subject to any disclaimer, the term of this patent is extended or adjusted under 35 U.S.C. 154(b) by 335 days.

(21) Appl. No.: 12/382,046

(22) Filed: Mar. 6, 2009

(65) Prior Publication Data

US 2009/0230764 A1    Sep. 17, 2009

(30) Foreign Application Priority Data

Mar. 11, 2008    (JP) ................... 2008-060390

(51) Int. Cl.
*H02P 9/00*    (2006.01)
(52) U.S. Cl. ............... 322/28; 322/24; 322/29; 322/44
(58) Field of Classification Search ............ 322/24, 322/28, 29, 44; 310/68 C, 68 R
See application file for complete search history.

(56) References Cited

U.S. PATENT DOCUMENTS 7,098,628 B2    8/2006    Maehara et al.
2007/0247119 A1*    10/2007    Maehara ................... 322/28
2008/0191482 A1*    8/2008    Okuno ..................... 290/7

FOREIGN PATENT DOCUMENTS

| JP | A-05-300669 | 11/1993 |
| JP | 2000341998 A | * 12/2000 |
| JP | A-2000-341998 | 12/2000 |
| JP | A-2005-192308 | 7/2005 |

OTHER PUBLICATIONS

Machine Translation JP2000341998 (2000).*
Dec. 22, 2009 Office Action issued in Japanese Patent Application No. 2008-060390 (with translation).

* cited by examiner

*Primary Examiner* — Quyen Leung
*Assistant Examiner* — Jose Gonzalez Quinones
(74) *Attorney, Agent, or Firm* — Oliff & Berridge, PLC

(57) ABSTRACT

The present invention provides, as one aspect, a generation control apparatus for vehicles which controls current supply to a field winding of a generator to control output voltage of the generator. The apparatus includes a switching element connected to the field winding, and a duty determining unit that increases a drive duty for interrupting the switching element when output voltage of the generator becomes lower than a predetermined regulated voltage. The apparatus also includes a load response control unit that performs load response control for limiting an increase rate of the drive duty determined by the duty determining unit, after expiration of a predetermined time from application of an electrical load.

4 Claims, 3 Drawing Sheets

GENERATION CONTROL APPARATUS FOR VEHICLES THAT CONTROLS CURRENT SUPPLY TO A FIELD WINDING OF A GENERATOR TO CONTROL OUTPUT VOLTAGE OF THE GENERATOR

CROSS REFERENCE TO RELATED APPLICATION

This application is based on and claims the benefit of priority from earlier Japanese Patent Application No. 2008-60390 filed Mar. 11, 2008, the description of which is incorporated herein by reference.

BACKGROUND OF THE INVENTION

1. Technical Field of the Invention

The present invention relates to a generation control apparatus for vehicles, which controls the condition of power generation of a vehicle generator loaded on such vehicles as passenger cars and trucks.

2. Related Art

Generally, vehicle generators are configured to detect the voltage of a control terminal (which is the positive terminal of a battery or the output terminal of the vehicle generator) for comparison with a reference value. As a result of the comparison, when the voltage of the control terminal is higher than the reference value, a transistor for performing on/off control of the field current is turned off. On the other hand, when the voltage of the control terminal is lower than the reference value, the transistor is turned on. Thus, such a vehicle generator is configured to control the duty factor of the field winding to keep the voltage of the control terminal at a constant level.

When an electrical load is applied, an amount of current corresponding to the applied electrical load is taken from the battery. Then, control is performed for an amount of voltage reduction corresponding to the taken out current, by increasing the duty factor of the field winding to increase the electric power generation, so that the voltage of the control terminal is regulated. Since this control is instantaneously performed, the voltage of the control terminal is hardly reduced but kept at a substantially constant value. However, this control necessitates a sharp increase of the field current of the vehicle generator, which leads to a sharp increase of the power generation torque of the vehicle generator. As a result, the engine speed is reduced. In particular, in an idling speed region, the reduction in the engine speed can cause engine stall.

A technique for taking a measure for the above problem is disclosed, for example, in Japanese Unexamined Patent Application Publication No. 5-300669. In this technique, a limitation is imposed on the increase rate of the duty factor of the field winding, in a case where the field current is increased, to suppress the sharp increase of the power generation torque of the vehicle generator. This technique lies in the function of suppressing the power generation of the vehicle generator. Accordingly, although torque fluctuation can be suppressed by this function, power generation will be insufficient while this function is exerted. Resultantly, the output voltage of the vehicle generator will be reduced.

In the technique disclosed in Japanese Unexamined Patent Application Publication No. 5-300669, the reduction in the output voltage is induced by imposing a limitation on the increase rate of the duty factor of the field winding at the time of applying electrical load. Accordingly, it has also been a problem that, when headlamps are lit, the intensity of light of the headlamps can vary.

In addition, electronic devices, including ECUs (electronic control units) and EPS (electronic power steering) sensitive to variation of voltage, are increasingly loaded on vehicles recently. Thus, in order to ensure normal operation of such electronic devices as well, engine stall is required to be prevented, while the voltage is prevented from being extremely reduced.

SUMMARY OF THE INVENTION

The present invention has been created in light of such problems and has as its object to provide a generation control apparatus for vehicles, which is able to suppress reduction of output voltage of a vehicle generator and is able to prevent the occurrence of engine stall.

In order to achieve the object, the present invention provides, as one aspect, a generation control apparatus for vehicles which controls current supply to a field winding of a generator to control output voltage of the generator, comprising: a switching element connected to the field winding; a duty determining unit that increases a drive duty for interrupting the switching element when output voltage of the generator becomes lower than a predetermined regulated voltage; and a load response control unit that performs load response control for limiting an increase rate of the drive duty determined by the duty determining unit, after expiration of a predetermined time from application of an electrical load.

DETAILED DESCRIPTION OF THE PREFERRED EMBODIMENTS

Figure 1:
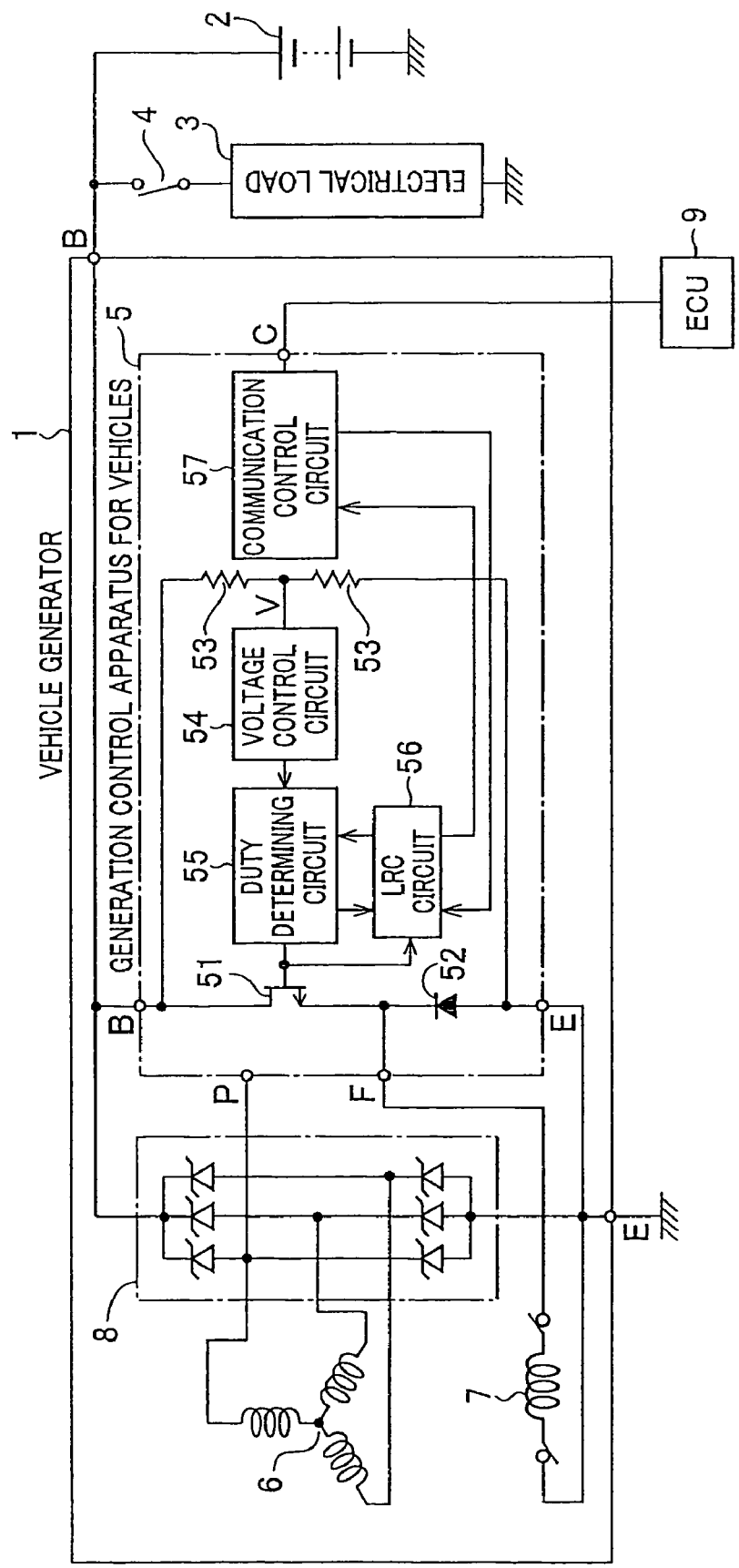
FIG. 1 is a schematic view illustrating a configuration of a generation control system for vehicles, according to an embodiment of the present invention.

With reference to the accompanying drawings, hereinafter is described, in detail, a generation control system for vehicles according to an embodiment to which the present invention is applied. FIG. 1 is a schematic view illustrating a configuration of the generation control system for vehicles, according to the embodiment. FIG. 1 shows a state where a vehicle generator including a generation control apparatus for vehicles is connected, for example, to an ECU (an external control unit disposed outside the vehicle generator) and a battery as well as an electrical load.

As shown in FIG. 1, a vehicle generator 1 of the present embodiment includes a generation control apparatus 5 for vehicles, an armature winding 6, a field winding 7 and a rectifier 8. The generator 1 is driven by an engine through a belt and a pulley. The field winding 7 generates a magnetic field, being supplied with current. The field winding 7 is wound about magnetic poles (not shown) to form a rotor. The armature winding 6, which is a multi-phase winding (e.g. three-phase winding), is wound about an armature core to form an armature. The armature winding 6 generates electromotive force, being induced by the change in the magnetic field generated by the field winding 7. The AC output induced to the armature winding 6 is supplied to the rectifier 8, for full wave rectification. The output of the rectifier 8 is taken out of a B terminal as an output of the vehicle generator 1 and supplied to a battery 2 and also supplied to an electrical load 3 via an electrical load switch 4. The output of the generator 1 changes according to the number of revolutions of the rotor and the amount of field current which flows through the field winding 7, while the field current is controlled by the generation control apparatus 5.

Hereinafter, a detailed explanation will be given on the generation control apparatus 5. The generation control apparatus 5 includes a switching element 51, a free wheel diode 52, a voltage divider circuit 53, a voltage control circuit 54, a duty determining circuit 55, an LRC (load response control) circuit 56 and a communication control circuit 57. It should be appreciated that the duty determining circuit 55 corresponds to a duty determining unit, the LRC circuit 56 corresponds to a load response control unit, and the communication control circuit 57 corresponds to a communication control unit.

The switching element 51 has a gate which is connected to the duty determining circuit 55, a drain which is connected to the B terminal of the vehicle generator 1, and a source which is connected to an E terminal (ground terminal) via the free wheel diode 52. The source of the switching element 51 is connected to the field winding 7 via an F terminal, so that field current passes through the field winding 7 when the switching element 51 is turned on and the field current is stopped when the switching element 51 is turned off. The free wheel diode 52 is connected in parallel with the field winding 7, so that the field current passing through the field winding 7 returns when the switching element 51 is turned off.

The voltage divider circuit 53 is configured by two resistors to divide the output voltage of the generator 1 (or the terminal voltage of the battery 2). The divided voltage is hereinafter referred to as "detected voltage V". The voltage control circuit 54 is configured to compare the detected voltage V with a predetermined reference voltage. When the detected voltage V is lower than the reference voltage, the voltage control circuit 54 outputs a high-level signal, and when the detected voltage V is higher than the reference voltage, the voltage control circuit 54 outputs a low-level signal.

The duty determining circuit 55 is configured to determine a drive duty (the duty factor of the field winding 7) Fduty, for on/off control of the switching element 51 in response to the output signals from the voltage control circuit 54. The duty determining circuit 55 drives the switching element 51 with the drive duty Fduty.

When the drive duty Fduty of the duty determining circuit 55 is increased in response to the electrical load that has been applied, the LRC circuit 56 calculates an amount ΔFd corresponding to the amount of increase. When the increased amount ΔFd exceeds a reference value, the information is transmitted accordingly to an ECU 9 to receive information required for the load response control from the ECU 9. Then, the drive duty Fduty of the duty determining circuit 55 is changed to thereby effect the load response control.

The communication control circuit 57 is connected to the ECU 9 via a C terminal (communication terminal) and a signal line to conduct transmission/reception of various pieces of information between itself and the ECU 9. It is preferable that the transmission/reception of various pieces of information is conducted with digital communication to suppress the influence of noise.

Figure 2:
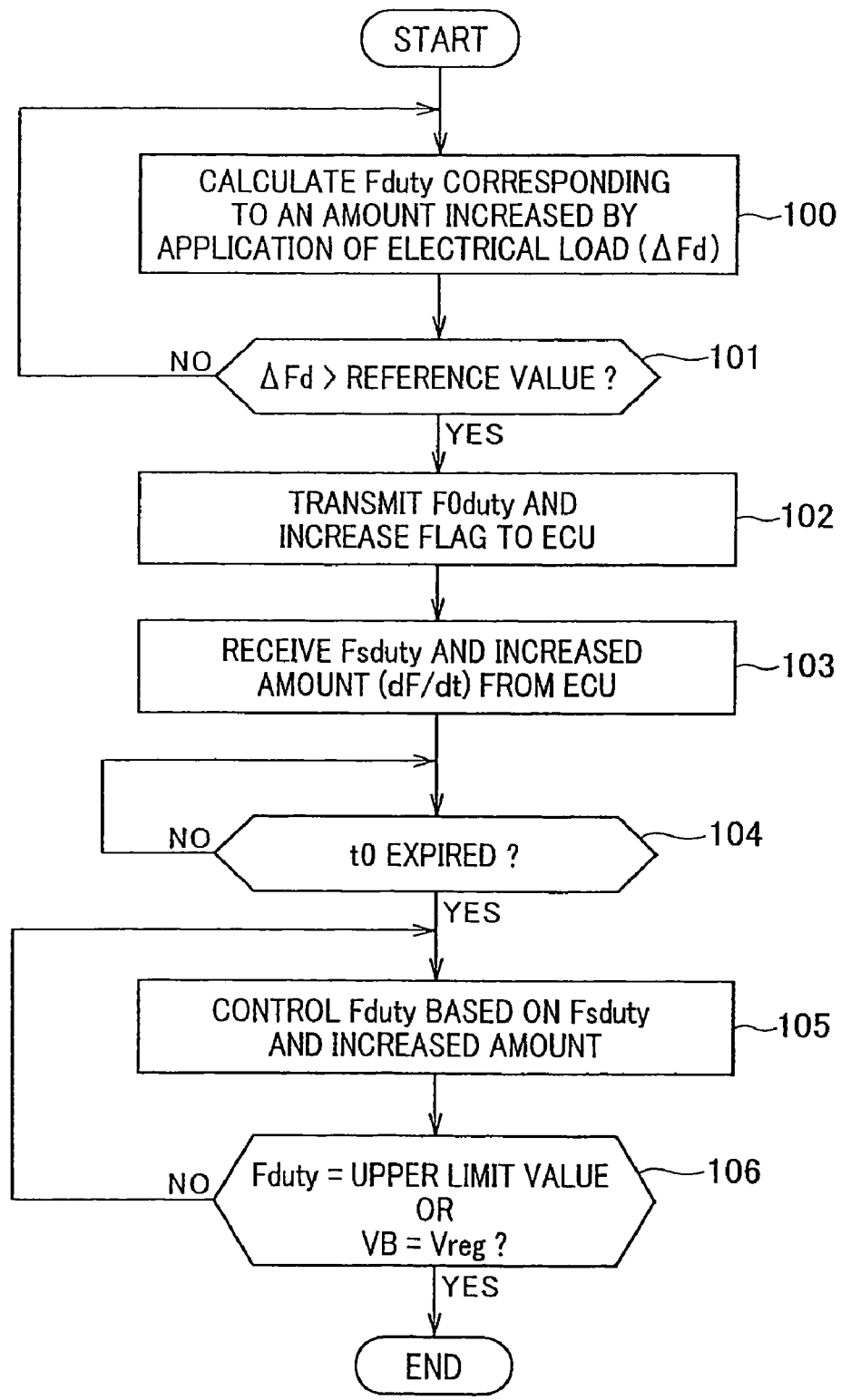
FIG. 2 is a flow diagram illustrating an operation procedure of power generation control performed in a generation control apparatus for vehicles in response to application of an electrical load.

The vehicle generator 1 of the present embodiment has the configuration as described above. Hereinafter, an explanation is given of the operation of the generation control system for vehicles including the vehicle generator 1 and the ECU 9. FIG. 2 is a flow diagram illustrating an operation procedure of the power generation control performed in the generation control apparatus 5 in response to the application of the electrical load 3.

The LRC circuit 56 in the generation control apparatus 5 retrieves the drive duty Fduty after the application of an electrical load, the drive duty Fduty being determined by the duty determining circuit 55. Then, the LRC circuit 56 calculates the increased amount ΔFd of the drive duty Fduty, which is increased due to the applied electrical load (step 100) and determines whether or not the increased amount ΔFd has exceeded the reference value (step 101). When the increased amount ΔFd does not exceed the reference value, a negative determination is made to repeat the operation in step 100.

When the increased amount ΔFd exceeds the reference value, a positive determination is made in step 101. To notify the ECU 9 of the determination, the LRC circuit 56 permits the communication control circuit 57 to transmit to the ECU 9 a drive duty F0duty immediately before the application of the electrical load 3 as well as an increase flag for notifying that the drive duty Fduty will be increased exceeding the reference value (step 102). The ECU 9 then determines an increase rate (dF/dt) of the drive duty Fduty and an initial value Fsduty of the drive duty Fduty (e.g., Fsduty=F0duty), which are necessary for the load response control in the generation control apparatus 5. The ECU 9 transmits the increase rate (dF/dt) and the initial value Fsduty to the generation control apparatus 5. It should be appreciated that the process of transmitting this notification to the ECU 9 is performed giving priority over the operation for transmitting information (various control signals) from the ECU 9 to the generation control apparatus 5. Also, the notification transmitted from the generation control apparatus 5 to the ECU 9 may be the increased amount ΔFd instead of the drive duty F0duty and the increase flag.

After receiving the initial value Fsduty and the increase rate (dF/dt) transmitted back from the ECU 9 via the communication control circuit 57 (step 103), the LRC circuit 56 determines whether or not a time t0 has expired since the increase of the drive duty Fduty in response to the application of the electrical load (step 104). When the time t0 has not expired, a negative determination is made to repeat the determination. No control is performed for limiting the drive duty Fduty which has been increased in response to the application of the electrical load, but the switching element 51 is driven with the drive duty Fduty of an upper limit value (e.g., 100%).

When the time t0 has expired, a positive determination is made in step 104. Then, the LRC circuit 56 controls the drive duty Fduty of the duty determining circuit 55, based on the initial value Fsduty and the increase rate (dF/dt) transmitted from the ECU 9 (step 105). This control is performed until the drive duty Fduty reaches the upper limit value, or until an output voltage VB of the vehicle generator reaches a regulated voltage Vreg (step 106).

Figure 3:
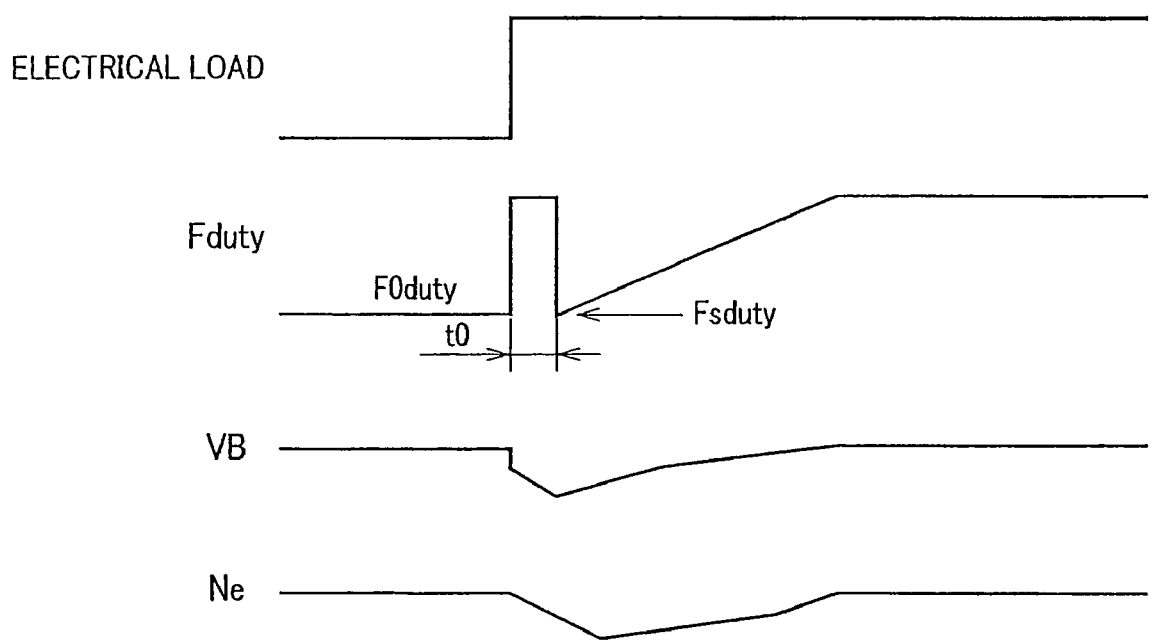
FIG. 3 is a diagram illustrating waveforms of signals issued in the operation under load response control performed in response to the application of an electrical load.

FIG. 3 is a diagram illustrating waveforms of signals issued in the operation under the load response control performed in response to the application of an electrical load. In FIG. 3, an engine speed is indicated by Ne. As shown in FIG. 3, even after the application of the electrical load 3, the load response control is not performed unless the time t0 expires, but the switching element 51 is driven with the drive duty Fduty of the upper limit value (e.g. 100%). After expiration of the time t0, the load response control is performed based on the information (Fsduty, dF/dt) transmitted from the ECU 9, while the switching element 51 is driven with the gradually increasing drive duty Fduty.

Thus, the generation control apparatus 5 of the present embodiment performs generation control without performing the load response control before the expiration of the predetermined time t0 from the application of an electrical load. Therefore, the reduction of the output voltage of the vehicle generator 1 can be suppressed to a low level. Also, performing the load response control after expiration of the predetermined time t0 can prevent large reduction of the engine speed and engine stall. In other words, by delaying the starting time of the load response control by the predetermined time t0, the degree of reduction in both of the output voltage of the vehicle generator 1 and the engine speed can be suppressed. Each degree of reduction can be adjusted by varying the time lag before the start of the load response control.

In addition, transmission of the information (Fsduty, dF/dt) for the load response control from the ECU 9 may enable generation control in consideration of the condition of use of the electrical load 3 and the traveling condition of the vehicle. Further, the information necessary for the load response control may be transmitted/received between the generation control apparatus 5 and ECU 9 before the expiration of the predetermined time t0 from the application of an electrical load. Therefore, control delay due to the time taken for the transmission/reception can be prevented.

The process of transmitting notification from the generation control apparatus 5 to the ECU 9 (the operation in step 102 of FIG. 2) is performed giving priority over the operation for transmitting information (various control signals) from the ECU 9 to the generation control apparatus 5. Therefore, the time can be shortened for the generation control apparatus 5 to receive the information necessary for the load response control from the ECU 9.

It will be appreciated that the present invention is not limited to the configurations described above, but any and all modifications, variations or equivalents, which may occur to those who are skilled in the art, should be considered to fall within the scope of the present invention.

For example, the embodiment described above has been configured to perform the load response control based on the information (Fsduty, dF/dt) transmitted from the ECU 9, after the expiration of the time t0 from the application of an electrical load. Alternatively, the pieces of reception information may be determined by the generation control apparatus 5, per se, so that the load response control may be executed by the generation control apparatus 5 alone, without being in conjunction with the ECU 9.

What is claimed is:

1. A generation control apparatus for vehicles which controls current supply to a field winding of a generator to control output voltage of the generator, comprising:
    a switching element connected to the field winding;
    a duty determining unit that increases a drive duty for interrupting the switching element when output voltage of the generator becomes lower than a predetermined regulated voltage; and
    a load response control unit that performs load response control for limiting an increase rate of the drive duty determined by the duty determining unit, after expiration of a predetermined time from application of an electrical load;
    a communication control unit that transmits a notification to an external control unit, the notification including a drive duty for the switching element before application of the electrical load and information indicating that an amount of increase of the drive duty, which increases with application of the electrical load, exceeds a reference value, wherein
    when the amount of increase of the drive duty exceeds the reference value, generation control is performed without performing the load response control before the expiration of the predetermined time, and
    the load response control unit receives, from the external control unit, an increase rate of the drive duty and an initial value of the drive duty which is determined by the external control unit based on the drive duty before application of the electrical load, and performs the load response control based on information regarding the initial value and the increase rate of the drive duty.

2. The apparatus according to claim 1, wherein the transmission of the notification from the communication control unit to the external control unit is performed giving priority over an operation for transmitting the information from the external control unit to the generation control apparatus for vehicles.

3. The apparatus according to claim 1, wherein the load response control is performed until the drive duty reaches an upper limit value.

4. The apparatus according to claim 1, wherein the load response control is performed until the output voltage of the generator reaches the regulated voltage.

* * * * *